United States Patent
Bertrand et al.

(10) Patent No.: US 6,687,252 B1
(45) Date of Patent: Feb. 3, 2004

(54) DYNAMIC IP ADDRESS ALLOCATION SYSTEM AND METHOD

(75) Inventors: Jean-Francois Bertrand, Montreal (CA); Hung Tran, Montreal (CA); Suhail Hasan, Redmond, WA (US); Miguel Cobo, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 636 days.

(21) Appl. No.: 09/592,096

(22) Filed: Jun. 12, 2000

(51) Int. Cl.$^7$ .............................................. H04L 12/28
(52) U.S. Cl. ...................................... 370/401; 370/352
(58) Field of Search ................................ 370/329, 352, 370/401, 409, 437; 709/245

(56) References Cited

U.S. PATENT DOCUMENTS

| | | | | |
|---|---|---|---|---|
| 5,758,282 A | * | 5/1998 | Yamashina et al. | 370/437 |
| 6,405,253 B1 | * | 6/2002 | Schutte et al. | 370/409 |
| 6,427,174 B1 | * | 7/2002 | Sitaraman et al. | 709/245 |
| 6,515,989 B1 | * | 2/2003 | Ronneke | 370/401 |
| 6,542,935 B1 | * | 4/2003 | Ishii | 709/245 |
| 6,587,455 B1 | * | 7/2003 | Ray et al. | 370/352 |

FOREIGN PATENT DOCUMENTS

| | | | |
|---|---|---|---|
| WO | WO99/52237 | 10/1999 | |
| WO | WO 00/64203 | * 10/2000 | H04Q/7/22 |

OTHER PUBLICATIONS

3GPP Organisational Partners; Technical Specification; "3$^{rd}$ Generation Partnership Project; Technical Specification Group Core Network; General Packet Radio Service (GPRS); GPRS Tunnelling Protocol (GTP) across the Gn and Gp Interface"; Release 1999; pp. 1–87; http://www.3gpp.org.

Ian Maclean, Sr. Product Manager, Wireless Internet Portfolio, Nortel Networks, Inc.; "The Wireless VPN Corporate Access & Service" ; not dated; pp. 1–7.

* cited by examiner

*Primary Examiner*—Salvatore Cangialosi
(74) *Attorney, Agent, or Firm*—Smith & Danamraj, PC

(57) ABSTRACT

In a General Packet Radio Service (GPRS) network, a system and method of dynamically allocating an Internet Protocol (IP) address to a mobile terminal (MT) operating in the network. A Gateway GPRS Service Node (GGSN) requests IP addresses over the Gi interface from a Radius server in an IP-based network. A Conditional PDP Address (CPA) parameter is stored in the MT's Home Location Register (HLR) as part of the user subscriber data, and is passed to the GGSN during the GPRS Attach procedure. The CPA parameter indicates whether the subscriber is entitled to a backup IP address in case of failure to obtain one over the Gi interface, and whether the MT is a user of a real-time application. A timer in the GGSN sets a maximum time period (Ti) that the GGSN will wait for a response from the server, and a counter (Ni) sets the maximum number of requests that are sent. A Network Access Server (NAS) in the GGSN sends a request for an IP address from the GGSN to the server, and determines whether Ti expires without receiving a response from the server. If no response is received, the GGSN allocates an IP address. A public IP address is allocated only if the MT is a user of a real-time application. Otherwise, a private IP address is allocated.

18 Claims, 5 Drawing Sheets

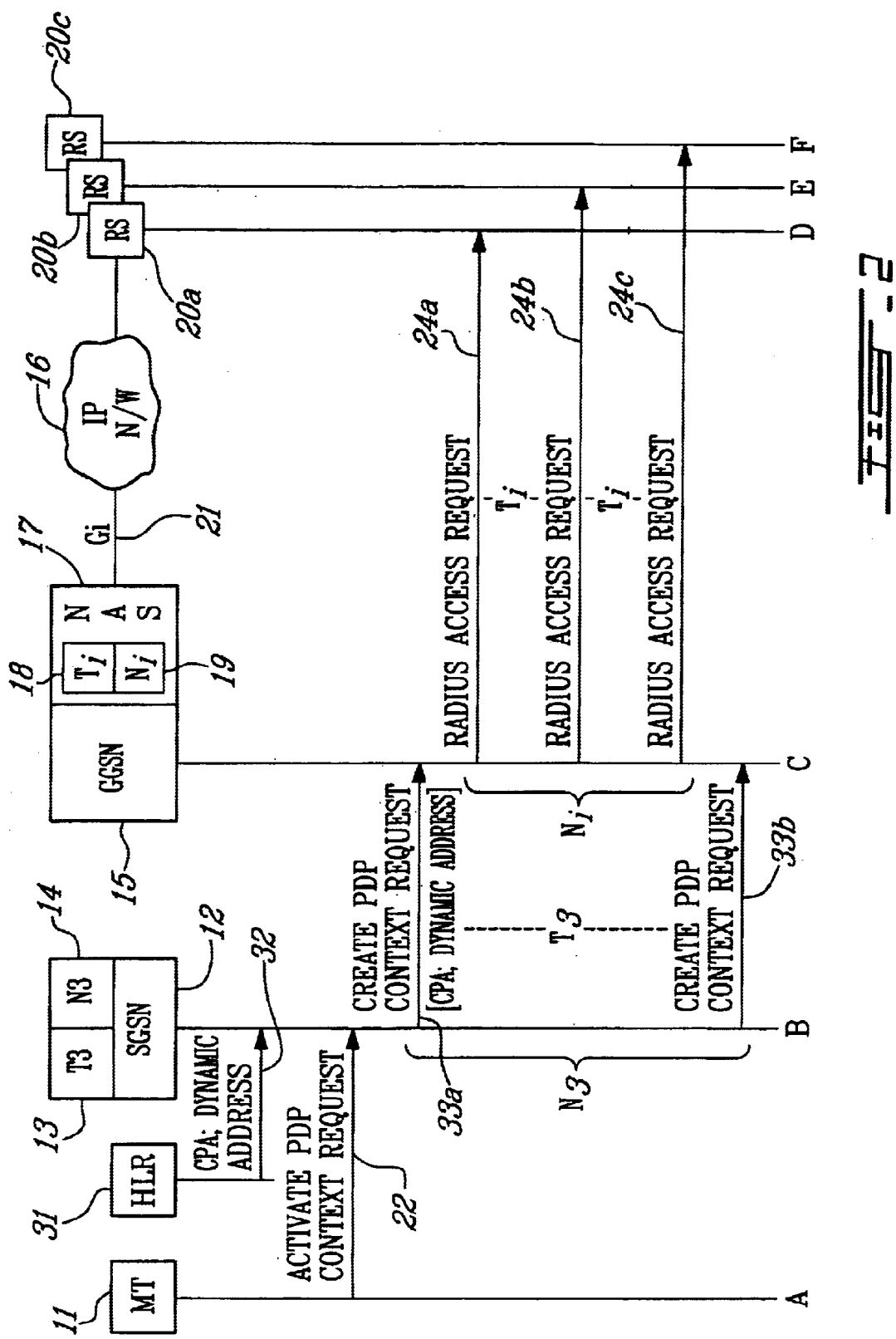

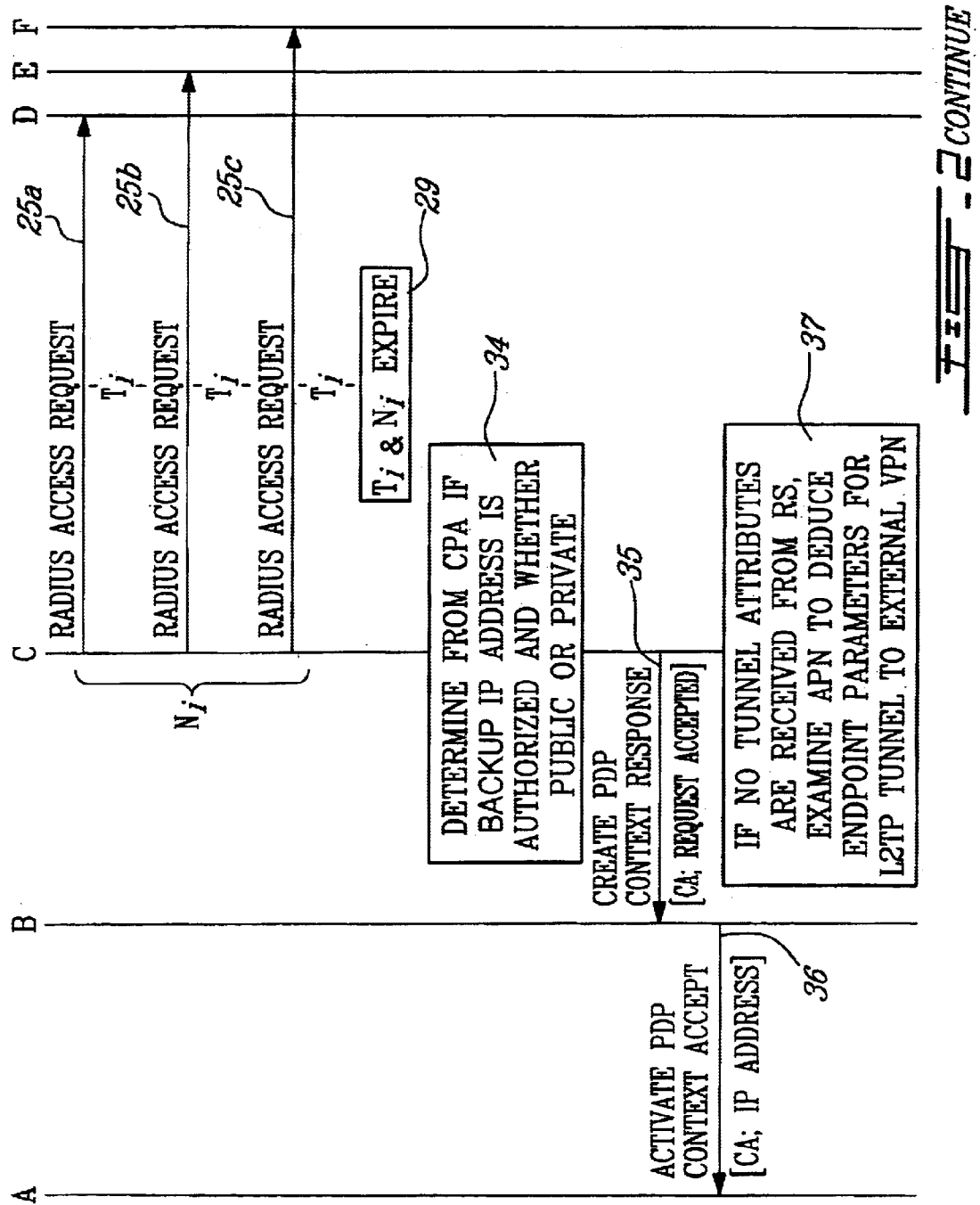
FIG. 2 CONTINUE

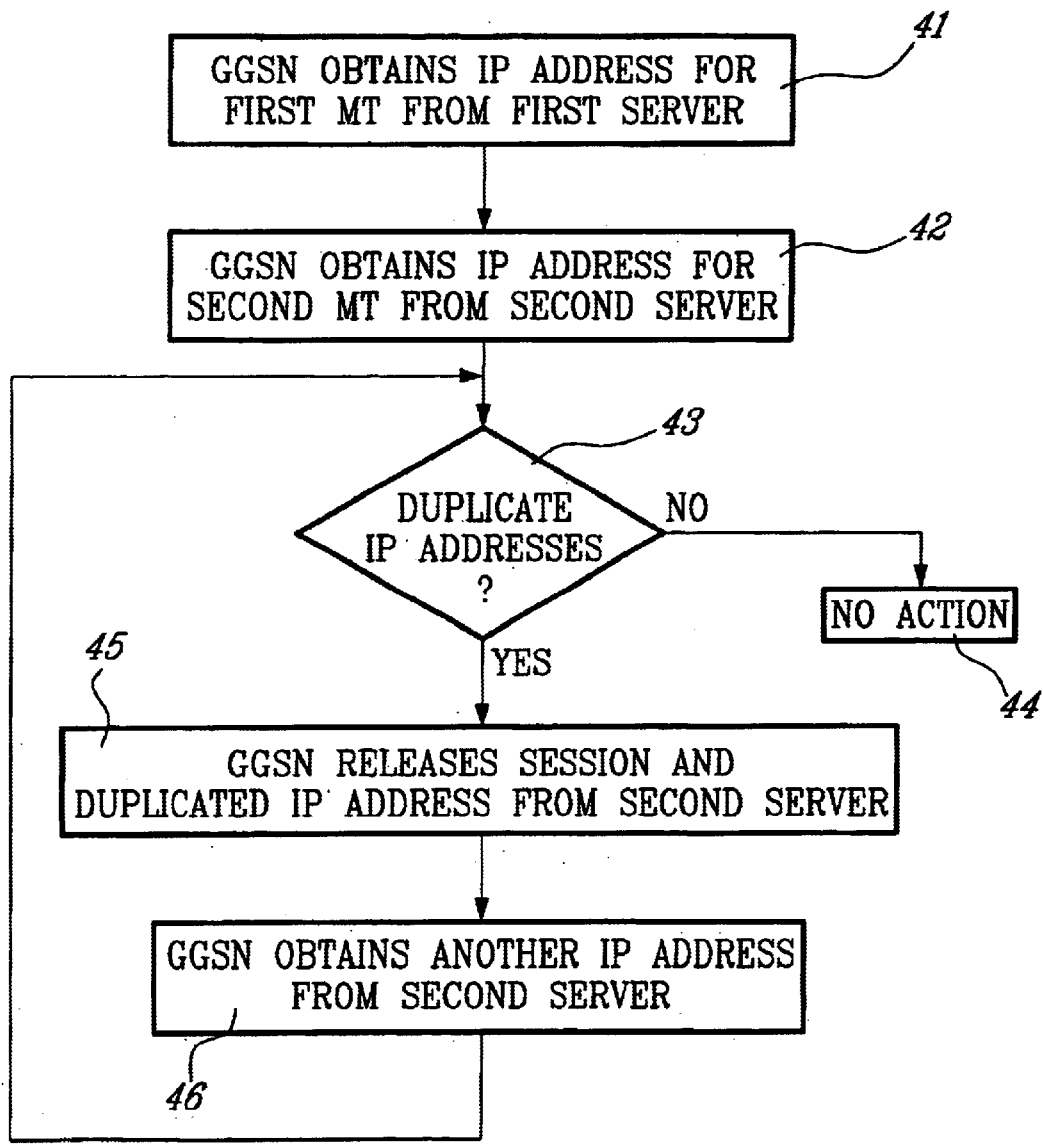

DYNAMIC IP ADDRESS ALLOCATION SYSTEM AND METHOD

BACKGROUND OF THE INVENTION

1. Technical Field of the Invention

This invention relates to telecommunications and data network systems and, more particularly, to a system and method for dynamically allocating Internet Protocol (IP) addresses to mobile terminals operating in a General Packet Radio Service (GPRS) network.

2. Description of Related Art

When a Mobile Terminal (MT) accesses a GPRS network, a Packet Data Protocol (PDP) Context Activation procedure is utilized to obtain an IP address for the MT. An initial request from the MT is sent to a Serving GPRS Service Node (SGSN) which forwards the request to a Gateway GPRS Service Node (GGSN). The GGSN then interfaces over a Gi interface to either a Radius server or a Dynamic Host Configuration Protocol (DHCP) server to authenticate the MT and obtain an IP address. Several problems, however, arise when MTs attempt to obtain IP addresses with the existing procedures. First, because of the tremendous increase in the usage of the Internet, IP addresses are becoming scarce, and, the particular server that is accessed by the GGSN may have exhausted its allocation of addresses. Alternatively, the server may be down or malfunctioning, or there may be a problem with the link between the GGSN and the server. In any event, there may be times that an IP address cannot be provided to an MT.

In an effort to solve the problem of scarce IP addresses, the Internet Engineering Task Force (IETF) has proposed a solution that uses alternative addresses known as private IP addresses. Private IP addresses can be used anywhere. For example, if MT1 travels outside its home network, it may connect to its home Internet Service Provider (ISP). If the home ISP does not have an actual (public) IP address that it can provide to MT1, the home ISP may provide MT1 with a private IP address. This solution, however, causes a second problem to become apparent with the existing procedures. When a second MT (MT2) connects to a different ISP, it may also be provided with a private IP address. There is no deconfliction of private IP addresses between ISPs to ensure that the same IP address is not given to more than one MT. Therefore, the ISP serving MT2 may provide the same private IP address to MT2 that was provided to MT1, causing a clash of IP addresses in the network.

Another IETF proposal defines a Network Address Translator (NAT) in an attempt to overcome this problem. The NAT device temporarily provides a global public IP address and converts a private IP address to a unique public IP address. If a party is provided with a private IP address, the address can only be used within a private network unless a NAT device is used to translate the address. This solution works fine for most applications, but does not work for real-time applications such as H.323 Voice-over-IP (VoIP). In VoIP, the IP addresses of the parties are contained in the payload itself in addition to the packet headers. The situation may arise, therefore, when MT1 is conducting a VoIP session with MT2, and MT1 sends an IP packet in which the source address is a private IP address. The destination address is MT2's IP address (public or private). The NAT device changes the source IP address in the header to a temporary public IP address, but the payload still identifies the source IP address as the private IP address. Thus, there is an IP address mismatch that creates problems for real-time applications such as VoIP.

Another problem with existing methods of allocating IP address is the unpredictability of the Gi interface between the GGSN and the server from which IP addresses are requested. While the other interfaces in GPRS (Gs, Gr, Gn, etc.) are tightly controlled, the Gi interface is completely unpredictable.

There are no known prior art teachings of a solution to the aforementioned deficiencies and shortcomings such as that disclosed herein. In order to overcome the disadvantage of existing solutions, it would be advantageous to have a system and method for dynamically allocating IP addresses to MTs in a GPRS network that prevents IP address conflicts and provides addresses that are usable to MTs running real-time applications such as VoIP. In addition, the system and method would bring some order and predictability into the Gi interface. The present invention provides such a system and method.

SUMMARY OF THE INVENTION

In one aspect, the present invention is a method of dynamically allocating an IP address to a mobile terminal operating in a GPRS network that includes an SGSN serving the mobile terminal and a GGSN connecting the GPRS network to a server that allocates IP addresses in an IP-based network. The method includes the steps of setting a counter in the GGSN to control the maximum number (Ni) of requests for an IP address that are to be sent from the GGSN to the server; and setting a timer in the GGSN to control a maximum time period (Ti) that the GGSN will wait for a response from the server after each request for an IP address is sent. The GGSN then sends to the server, a sequence of requests for an IP address, with each request being separated from the previous request by time period Ti, and the sequence being halted if a response is received from the server within time period Ti after one of the requests is sent. If a response from the server including an IP address for the mobile terminal is received in the GGSN within time period Ti after one of the requests is sent, the IP address is sent from the GGSN to the mobile terminal.

In another aspect, the present invention is a method by which the GGSN dynamically learns the average time (Tr) and the average number of retries (Nr) for exchanging Radius authentication messages with different Internet Service Provider/Access Point Names (ISP/APNs). For Us those networks involving long delays, the GGSN may use a new signaling scheme to change the GGSN signaling time parameter Ti to ensure that the core packet network reflects the latest topology of the external ISP network.

In another aspect, the present invention is a method of dynamically allocating an IP address to a mobile terminal operating in a GPRS network that includes an SGSN serving the mobile terminal and a GGSN connecting the GPRS network to a server that allocates IP addresses in an IP-based network. The method includes the steps of receiving in the GGSN, information regarding whether the mobile terminal is authorized to receive a backup IP address if an IP address cannot be obtained from the server, and whether the mobile terminal is a user of a real-time application. The method also sets on a timer in the GGSN, a maximum time period (Ti) that the GGSN will wait for a response from the server after a request for an IP address is sent from the GGSN to the server. The method then sends a request for an IP address from the GGSN to the server. If it is determined that time period Ti expired without receiving a response from the server that includes an IP address for the mobile terminal, then it is further determined from the information in the GGSN whether the mobile terminal is authorized to receive a backup IP address. Upon determining that the mobile terminal is authorized to receive a backup IP address, the method determines from the information in the GGSN whether the mobile terminal is a user of a real-time application. If the mobile terminal is a user of a real-time application, this is followed by sending a public IP address from the GGSN to the mobile terminal. If the mobile terminal is not a user of a real-time application, the method sends a private IP address from the GGSN to the mobile terminal instead.

In yet another aspect, the present invention is a system for dynamically allocating an IP address to a mobile terminal operating in a GPRS network. The system includes a Home Location Register (HLR) that stores information regarding whether the mobile terminal is authorized to receive a backup IP address if an IP address cannot be obtained from the server, and whether the mobile terminal is a user of a real-time application. The information is sent via an SGSN to the GGSN. The system also includes a timer in the GGSN for setting a maximum time period (Ti) that the GGSN will wait for a response from the server after a request for an IP address is sent from the GGSN to the server. A Network Access Server (NAS) in the GGSN includes means for sending a request for an IP address from the GGSN to the server, and means for determining that time period Ti expired without receiving a response from the server that includes an IP address for the mobile terminal. Additionally, the system includes means in the GGSN for determining from the information in the GGSN whether the mobile terminal is authorized to receive a backup IP address, and if so, determining from the information in the GGSN whether the mobile terminal is a user of a real-time application. Finally, the system includes means for sending a public IP address from the GGSN to the mobile terminal upon determining that the mobile terminal is a user of a real-time application, and means for sending a private IP address from the GGSN to the mobile terminal upon determining that the mobile terminal is not a user of a real-time application.

In yet another aspect, the GGSN is modified to filter and monitor the Gi interface to ensure that no two mobile terminals currently sharing the same Gi interface are provided with duplicate private IP addresses by different ISPs. If a second mobile terminal is given a duplicate IP address by another ISP, the GGSN signals a rejection of that IP address to the ISP's Radius server, and requests the provision of an alternate IP address.

In still yet another aspect, the present invention is a modified GGSN in a GPRS network. The GGSN dynamically allocates an IP address to a mobile terminal operating in the GPRS network and includes a counter for setting a maximum number (Ni) of requests for an IP address that are to be sent from the GGSN to the server, and a timer for setting a maximum time period (Ti) that the GGSN will wait for a response from the server after each request for an IP address is sent. The GGSN also comprises a NAS that includes means for sending a sequence of requests for an IP address from the GGSN to the server. Each request is separated from the previous request by time period Ti, and the sequence is halted if a response is received from the server within time period Ti after one of the requests is sent. The NAS also includes means for receiving a response from the server that includes an IP address for the mobile terminal. Finally, the GGSN includes means for sending the IP address from the GGSN to the mobile terminal.

For Virtual Private Networks (VPNs), where the request for setting up a Layer 2 Tunneling Protocol (L2TP) tunnel comes from the Radius server access response, a failure to receive a Radius Access Accept message within a certain time interval causes the GGSN to examine the Access Point Name (APN) and to deduce tunnel endpoint parameters for setting up the L2TP tunnel.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 2 is a signal flow diagram illustrating the flow of messages when performing a second embodiment of the method of the present invention to allocate an IP address to a mobile terminal when the Radius server fails to provide an IP address;

FIG. 3 is a flow chart of the steps performed by the present invention to ensure that the same IP address is not assigned to more than one MT by multiple ISPs.

DETAILED DESCRIPTION OF EMBODIMENTS

The present invention is a system and method for dynamically allocating IP addresses to MTs in a GPRS network that prevents IP address conflicts and provides addresses that are usable to MTs running real-time applications such as VoIP. Additionally, the present invention provides a greater degree of predictability and control to the Gi interface.

During the IP address allocation phase, if the GGSN is unable to obtain an IP address from the radius server within a required time period, the invention provides the MT with an IP address. The address provided may be a public IP address or a private IP address. Based on the MT's subscriber data in the HLR, or other designations that identify a subscriber as a user of VoIP or other real-time applications, the invention provides the MT with a public IP address instead of a private IP address. The present invention adds a filter to the GGSN to ensure that no two ISPs sharing the same Gi interface inadvertently provide duplicate private IP addresses to two different mobile terminals sharing the same GPRS access network. The invention also enables the GGSN to deduce VPN and L2TP tunnel parameters based on the APN so that a failure to receive a response from a Radius server does not prevent L2TP tunnel setup. At the discretion of the system operator, there may be a higher charge for the public IP address.

Figure 1:
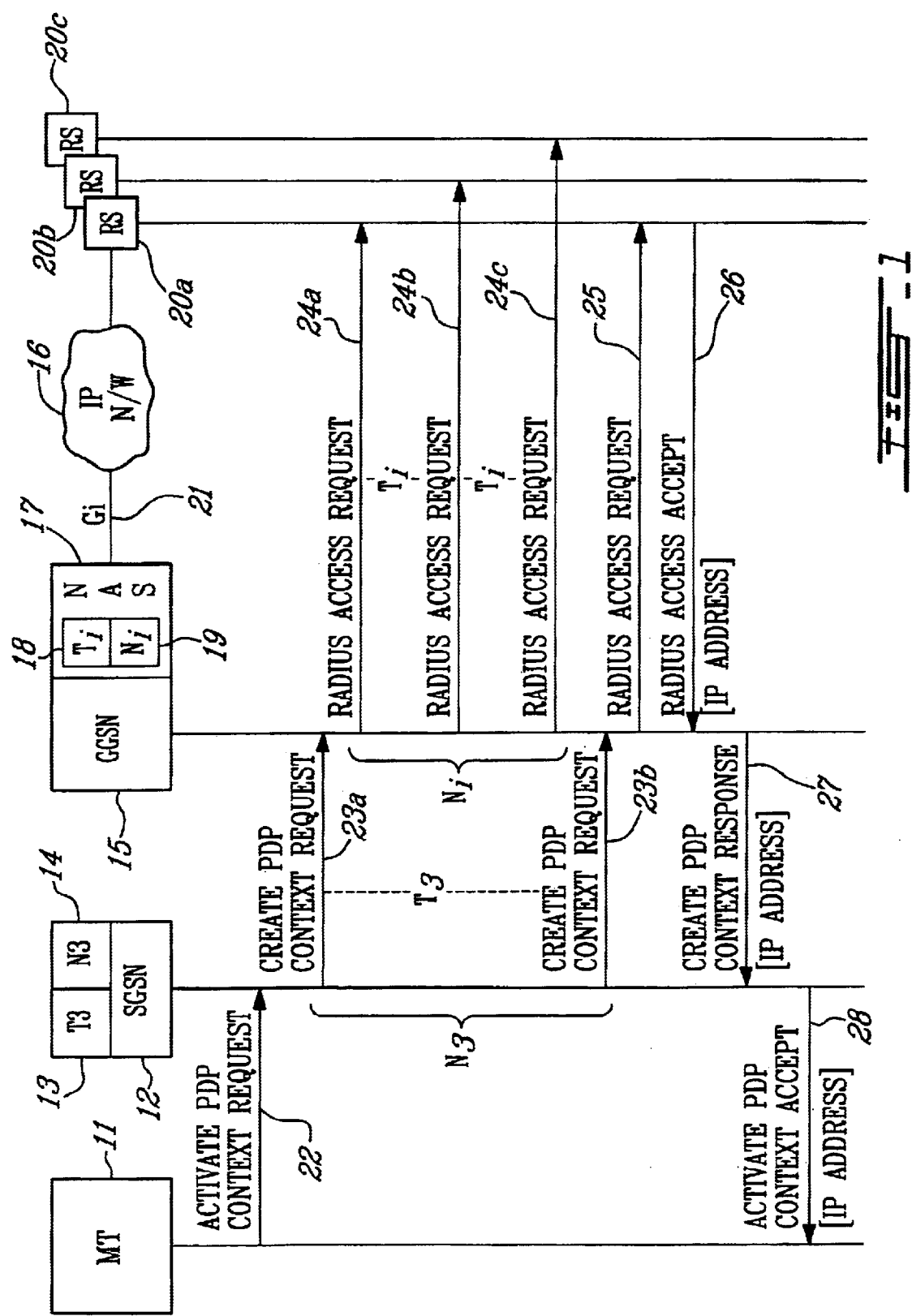
FIG. 1 is a signal flow diagram illustrating the flow of messages when performing a first embodiment of the method of the present invention to allocate an IP address from a Radius server to a mobile terminal.

FIG. 1 is a signal flow diagram illustrating the flow of messages when performing a first embodiment of the method of the present invention to allocate an IP address to a mobile terminal. The components of the system of the present invention are illustrated across the top of the figure. A mobile terminal (M) 11 is served by an SGSN 12. The SGSN includes a timer (T3) 13 and a counter (N3) 14. The SGSN communicates with a GGSN 15 to gain access to an IP-based network 16. The GGSN includes a Network Access Server (NAS) 17 that connects to the IP-based network. The NAS includes a new timer (Ti) 18, and a new counter (Ni) 19. A plurality of Radius servers (RS) 20a to 20c belonging to an Internet Service Provider (ISP) are accessed by the GGSN over the Gi interface 21 in order to obtain an IP address for the MT.

The MT 11 sends an Activate PDP Context Request message 22 to the SGSN 12 to activate the PDP Context. The SGSN sets up T3 and N3 to control the time and number of Create PDP Context Request messages 23a and 23b that it sends to the GGSN 15 to create the PDP Context. A response from the GGSN is required within time T3. Using existing procedures, if a response is not received before T3 expires, the activation is a failure, and the MT does not receive an IP address. The message may be repeated for a total of N3 times, restarting the T3 timer each attempt. Thus, the total time that the SGSN may spend trying to get a response from the GGSN is T3×N3.

Upon receiving the first Create PDP Context Request message 23a, the GGSN sends a first Radius Access Request message 24a over the Gi interface to an RS 20a. The Radius Access Request message is unicast to an identified RS. This may be a direct link, or the message may pass through several routers. The GGSN constructs a Network Access Identifier (NAI) and includes the NAI in the Radius Access Request message along with an authentication request and an IP frame request. The RS performs its authentication functions, finds an IP address, and starts accounting based on the NAI. Existing procedures do not provide a time limit for receiving a response from the RS, and there is no provision for repeating the message if a response was not received. The GGSN merely waits for a response until the T3 timer 13 expires in the SGSN, and the IP address allocation process fails.

The present invention adds the Ti timer 18 and the Ni counter 19 to the GGSN to bring some order and predictability into the Gi interface. The other interfaces in GPRS (Gs, Gr, Gn, etc.) are tightly controlled, but the Gi interface is completely unpredictable. Ti is the time period that the GGSN will wait for a response from the RS. The Ti timer may expire if the RS takes too long to perform its authentication functions and to find an IP address. If no response is received before Ti expires, the GGSN repeats the Radius Access Request message for a total of Ni times. FIG. 1 illustrates an exemplary scenario in which the Radius Access Request message is repeated three times as messages 24a, 24b, and 24c are sent to the RS. Thus, the total time that the GGSN may spend trying to get a response from the RS is Ti×Ni. Note that Ti×Ni must be less than time T3.

Note also that Ti and Ni can be added to any NAS to improve its performance. NASs are utilized for network access by any ISP, and are widely used in applications other than GPRS.

Each time that the Radius Access Request message is repeated, it may be unicast to the same RS or to a different RS. FIG. 1 illustrates the example in which each Radius Access Request message is sent to a different RS. After the last Radius Access Request message 24c is sent, and no response is received, timer T3 in the SGSN may expire. The SGSN may then send another Create PDP Context Request message 23b to the GGSN, depending on the setting of counter N3. At this point, the GGSN sends another Radius Access Request message 25 to the RS. In the example shown in FIG. 1, the RS 20a performs its authentication functions and provides an IP address in a Radius Access Accept message 26 prior to the expiration of Ti. The GGSN then returns a Create PDP Context Response message 27 to the SGSN, and the SGSN provides the IP address to the MT in an Activate PDP Context Accept message 28.

FIG. 2 is a signal flow diagram illustrating the flow of messages when performing a second embodiment of the method of the present invention to allocate an IP address to a mobile terminal when the Radius server fails to provide an IP address. In the example shown in FIG. 2, the GGSN sends a second sequence of Radius Access Request messages 25a to 25c to the RS, and the RS fails to provide an IP address before Ti expires at 29 following Radius Access Request message 25c, which is the final message allowed by Ni. Once Ti and Ni have expired, the present invention provides an IP address to the MT utilizing the following procedures.

A new parameter called the Conditional PDP Address (CPA) parameter is stored in the MT's Home Location Register (HLR) 31 as part of the user subscriber data. The CPA parameter indicates whether the subscriber is entitled to a backup IP address in case of failure to obtain one over the Gi interface. If so, it is also used to determine whether the backup IP address is a private IP address or a public IP address. If it is a private IP address, a NAT is required as part of the GGSN's Gi interface router. The CPA parameter may be implemented as a 2-bit field in the PDP Context record of the user subscriber data. The first bit is a binary "Yes" or "No" to allow or deny the user a contingency IP address in case of failure. The second bit indicates whether the user is allowed to use real-time applications, and thus whether the user should be allocated a public or private IP address.

During the GPRS Attach procedure, the subscriber's record is sent by the HLR to the SGSN at step 32. In those cases where dynamic addresses are allowed, the SGSN sends relevant fields to the GGSN, including the new CPA field and the existing field "Dynamic Address". The SGSN sends these fields in the Create PDP Context Request message 33a (and 33b if required) and then starts timer T3. The GGSN examines the Create PDP Context Request message to determine whether CPA is enabled. If so, it sends the first Radius Access Request message 24a in a sequence of messages to the RS and starts timer Ti. Alternatively, a DHCP server may be queried for the IP address. Additionally, as a Network Access Server (NAS), the GGSN may have an internal pool of addresses.

Upon expiration of timer Ti and counter Ni at step 29, if the GGSN has not received an acknowledgment message from the RS, the GGSN determines that there is a failure of the Gi interface, and at step 34 determines from the CPA field whether the user is authorized to receive a contingency IP address in case of failure in receiving an address from the RS. Based on the second bit in the CPA field, the GGSN allocates either a public IP address or a private IP address. The GGSN has a limited number of public IP addresses that it can provide. Therefore, the present invention utilizes this methodology to ensure that public IP addresses are provided only to those users who really require a public address for real-time applications.

The GGSN then sends a Create PDP Context Response message 35 to the SGSN and includes the existing "Request Accepted" information element. In addition, a new information element called the. CPA Assigned (CA) Information Element is included to inform the SGSN of the IP address being provided and any limitations of the new IP address for the MT. Alternatively, the GTP information element "Private Extension" may be utilized for this purpose.

Optionally, the SGSN may insert the CA information element in the Activate PDP Context Accept message 36 that it sends to the MT, thus notifying the MT that a different prefix is being used for the IP address. Once the MT receives the IP address, it can launch any IP-based application. If a public IP address has been provided, the MT can launch real-time applications such as VoIP. It is preferable to provide an IP address to the MT with the same network prefix as the MT's home address. For MTs using new private IP addresses to access their corporate LANs, if no tunnel attributes are returned in the Radius response, the GGSN can examine the APN at step 37, and use these parameters to create a VPN tunnel to a remote site, and can optionally examine the CA and APN parameters to determine whether to signal the core network to create a NAS-to-NAS tunneled connection between the GGSN and the external private network. This assumes that for subscribers wishing to access their corporate e-mail server, the subscribed ISP address and the corporate network are not the same.

For private IP connectivity, the tunneled connection requires an agreement between the Public Land Mobile Network (PLMN), the ISP, and the corporate LAN for alternate routes for connectivity. This is because corporate networks only admit traffic by authenticated users, and only allow traffic from certain ISPs or GPRS operators. Traffic to and from the corporate network is tunneled between the corporate NAS and a NAS in the core GPRS network. The authorization for the GPRS to set up the tunnel, and the alternate routes to the corporate LAN may be contained in the Access Point Name (APN)-based Domain Name Server (DNS) record.

FIG. 3 is a flow chart of the steps performed by the present invention to ensure that the same IP address is not assigned to more than one MT by multiple ISPs. The GGSN filters on all Gi interfaces to ensure that no two activated mobile terminals are allocated the same private IP address. At step 41, the GGSN 15 obtains an IP address for a first MT from a first ISP Radius server. At step 42, the GGSN obtains an IP address for a second MT from a second ISP Radius server. If it is determined at 43 that the second IP address not the same as the first IP address, the process moves to step 44, and no action is taken. However, if the second IP address is determined to be a duplicate private IP address at 43, the GGSN may perform an accounting start and stop at 45 to release the session and the duplicated IP address. The GGSN then sends a second Access Request message to the second ISP Radius server in order to request another private IP address from the second server at 46. The IP addresses are compared until the GGSN ensures that duplicate addresses are not allocated.

Figure 4:
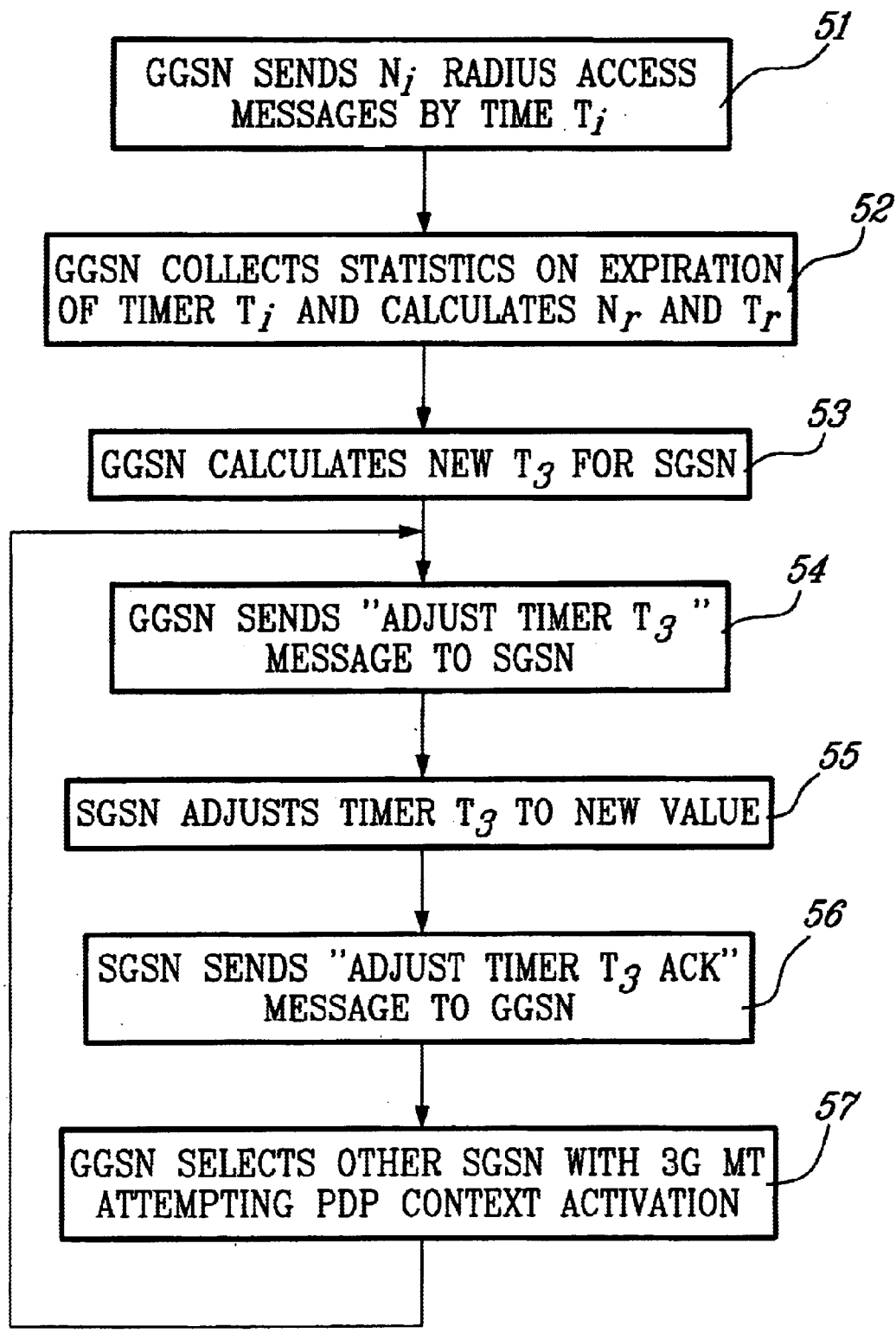
FIG. 4 is a flow chart illustrating the steps performed by the present invention when updating timers in the core packet network to reflect the latest topology of external ISP networks.

FIG. 4 is a flow chart illustrating the steps performed by the present invention when updating timers in the core packet network to reflect the latest topology of external ISP networks. The method of the present invention enables the GGSN to collect time duration statistics for different ISP/APNs, and if timer Ti frequently expires while waiting for a response, Ti may be updated, and the GGSN may signal the SGSN to update its timer T3 accordingly (since T3 must be greater than Ti×Ni).

At step 51, the GGSN 15 sends Ni Radius Access Messages to an ISP Radius server separated by time Ti. At 52, the GGSN collects statistics on the time required to receive responses, how often timer Ti expires, and how many attempts are required before a response is received. The GGSN calculates an average number of attempts (Nr) and an average time for response (Tr). At 53, the GGSN calculates a new setting for the T3 timer in the SGSN, which should be greater than Nr×Tr. At 54, the GGSN sends a new Adjust Timer T3 message to the SGSN with the new T3 setting. The SGSN adjusts its T3 timer at 55 and returns an Adjust Timer T3 Acknowledgment message to the GGSN at 56. Since the GGSN is mapped to a specific ISP/APN, the GGSN can send the Adjust Timer T3 message to any SGSN from which a 3G MT is attempting to perform a PDP Context activation and obtain an IP address. Thus, at 57, the GGSN selects other such SGSNs, and repeats the timer update process with them.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of dynamically allocating an Internet Protocol (IP) address to a mobile terminal operating in a General Packet Radio Service (GPRS) network, said GPRS network having a Serving GPRS Service Node (SGSN) serving the mobile terminal and a Gateway GPRS Service Node (GGSN) connecting the GPRS network to a server that allocates IP addresses in an IP-based network, said method comprising the steps of:

setting on a counter in the GGSN, a maximum number (Ni) of requests for an IP address that are to be sent from the GGSN to the server;

setting on a timer in the GGSN, a maximum time period (Ti) that the GGSN will wait for a response from the server after each request for an IP address is sent;

sending a sequence of requests for an IP address from the GGSN to the server, with each request being separated from the previous request by time period Ti, said sequence being halted if a response is received from the server within time period Ti after one of the requests is sent;

receiving in the GGSN, a response from the server that includes an IP address for the mobile terminal within time period Ti after one of the requests is sent; and sending the IP address from the GGSN to the mobile terminal.

2. The method of claim 1 wherein the step of sending a sequence of requests for an IP address from the GGSN to the server includes unicasting each of the requests in the sequence from the GGSN to a different server.

3. The method of claim 1 wherein the step of sending a sequence of requests for an IP address from the GGSN to the server includes sending a sequence of requests from the GGSN to a Radius server.

4. The method of claim 1 wherein the step of sending a sequence of requests for an IP address from the GGSN to the server includes sending a sequence of requests from the GGSN to a Dynamic Host Configuration Protocol (DHCP) server.

5. The method of claim 1 further comprising the steps of:
determining that the GGSN did not receive a response from the server within time period Ti after a last request was sent; and
allocating an IP address from an internal pool in the GGSN.

6. The method of claim 1 further comprising updating timers in the GPRS network to reflect actual response times experienced by the GGSN when requesting IP addresses from the server.

7. The method of claim 6 wherein the step of updating timers in the GPRS network includes the steps of:
collecting statistics by the GGSN on the actual response time to receive responses from the server, how often time period Ti is exceeded, and how many requests are sent before a response is received;

determining by the GGSN an average number of requests (Nr) required to receive a response from the server, and an average time (Tr) to receive a response; calculating by the GGSN a new setting for a T3 timer in the SGSN; and sending the new setting for the T3 timer from the GGSN to the SGSN.

8. The method of claim 7 wherein the step of updating timers in the GPRS network also includes sending by the GGSN the new setting for the T3 timer to any SGSN in the GPRS network from which an MT is attempting to obtain an IP address.

9. A method of dynamically allocating an Internet Protocol (IP) address to a mobile terminal operating in a General Packet Radio Service (GPRS) network, said GPRS network having a Serving GPRS Service Node (SGSN) serving the mobile terminal and a Gateway GPRS Service Node (GGSN) connecting the GPRS network to a server that allocates IP addresses in an IP-based network, said method comprising the steps of:

receiving in the GGSN, information regarding whether the mobile terminal is authorized to receive a backup IP address if an IP address cannot be obtained from the server, and whether the mobile terminal is a user of a real-time application;

setting on a timer in the GGSN, a maximum time period (Ti) that the GGSN will wait for a response from the server after a request for an IP address is sent from the GGSN to the server;

sending a request for an IP address from the GGSN to the server;

determining that time period Ti expired without receiving in the GGSN, a response from the server that includes an IP address for the mobile terminal;

determining from the information in the GGSN whether the mobile terminal is authorized to receive a backup IP address;

upon determining that the mobile terminal is authorized to receive a backup IP address, determining from the information in the GGSN whether the mobile terminal is a user of a real-time application;

sending a public IP address from the GGSN to the mobile terminal upon determining that the mobile terminal is a user of a real-time application; and sending a private IP address from the GGSN to the mobile terminal upon determining that the mobile terminal is not a user of a real-time application.

10. A method of dynamically allocating an Internet Protocol (IP) address to a mobile terminal operating in a General Packet Radio Service (GPRS) network, said GPRS network having a Serving GPRS Service Node (SGSN) serving the mobile terminal and a Gateway GPRS Service Node (GGSN) connecting the GPRS network to a server that allocates IP addresses in an IP-based network, said method comprising the steps of:

setting on a counter in the GGSN, a maximum number (Ni) of requests for an IP address that are to be sent from the GGSN to the server;

setting on a timer in the GGSN, a maximum time period (Ti) that the GGSN will wait for a response from the server after each request for an IP address is sent;

sending a sequence of requests for an IP address from the GGSN to the server, with each request being separated from the previous request by time period Ti, said sequence being halted if a response is received from the server within time period Ti after one of the requests is sent;

determining that time period Ti expired following a last request in the sequence of Ni requests without receiving in the GGSN, a response from the server that includes an IP address for the mobile terminal;

determining from the information in the GGSN whether the mobile terminal is authorized to receive a backup IP address;

upon determining that the mobile terminal is authorized to receive a backup IP address, determining from the information in the GGSN whether the mobile terminal is a user of a real-time application;

sending a public IP address from the GGSN to the mobile terminal upon determining that the mobile terminal is a user of a real-time application; and sending a private IP address from the GGSN to the mobile terminal upon determining that the mobile terminal is not a user of a real-time application.

11. In a General Packet Radio Service (GPRS) network, a Gateway GPRS Service Node (GGSN) for dynamically allocating an Internet Protocol (IP) address to a mobile terminal operating in the GPRS network, said GPRS network including a Serving GPRS Service Node (SGSN) serving the mobile terminal, and said GGSN connecting the GPRS network to a server that allocates IP addresses in an IP-based network, said GGSN comprising:

a counter for setting a maximum number (Ni) of requests for an IP address that are to be sent from the GGSN to the server;

a timer for setting a maximum time period (Ti) that the GGSN will wait for a response from the server after each request for an IP address is sent;

a Network Access Server (NAS) that includes:

means for sending a sequence of requests for an IP address from the GGSN to the server, with each request being separated from the previous request by time period Ti, said sequence being halted if a response is received from the server within time period Ti after one of the requests is sent; and means for receiving a response from the server that includes an IP address for the mobile terminal; and means for sending the IP address from the GGSN to the mobile terminal.

12. The GGSN of claim 11 wherein the means for sending a sequence of requests for an IP address from the GGSN to the server includes means for unicasting each of the requests in the sequence from the GGSN to a different server.

13. The GGSN of claim 11 wherein the means for sending a sequence of requests for an IP address from the GGSN to the server includes a Radius client for sending a sequence of requests from the GGSN to a Radius server.

14. The GGSN of claim 11 wherein the means for sending a sequence of requests for an IP address from the GGSN to the server includes a Dynamic Host Configuration Protocol (DHCP) client for sending a sequence of requests from the GGSN to a DHCP server.

15. In a General Packet Radio Service (GPRS) network having a Serving GPRS Service Node (SGSN) serving a mobile terminal operating in the GPRS network, and a Gateway GPRS Service Node (GGSN) connecting the GPRS network to a server that allocates IP addresses in an IP-based network, a system for dynamically allocating an Internet Protocol (IP) address to the mobile terminal, said system comprising:

a Home Location Register (HLR) that stores information regarding whether the mobile terminal is authorized to receive a backup IP address if an IP address cannot be obtained from the server, and whether the mobile terminal is a user of a real-time application;

means for sending the information to the GGSN, a timer in the GGSN for setting a maximum time period (Ti) that the GGSN will wait for a response from the server after a request for an IP address is sent from the GGSN to the server;

a Network Access Server (NAS) in the GGSN that includes:

means for sending a request for an IP address from the GGSN to the server; and means for determining that time period Ti expired without receiving a response from the server that includes an IP address for the mobile terminal;

means in the GGSN for determining from the information in the GGSN whether the mobile terminal is authorized to receive a backup IP address, and if so, determining from the information in the GGSN whether the mobile terminal is a user of a real-time application;

means for sending a public IP address from the GGSN to the mobile terminal upon determining that the mobile terminal is a user of a real-time application; and means for sending a private IP address from the GGSN to the mobile terminal upon determining that the mobile terminal is not a user of a real-time application.

16. A system for dynamically allocating an IP address to a mobile terminal operating in an access network, said system comprising:

a Network Access Server (NAS) connecting the access network to a server that allocates IP addresses in an Internet Protocol (IP)-based network, said NAS including:

means for sending a request for an IP address to the server; and means for receiving an IP address from the server; and an Authorization, Authentication, and Accounting (AAA) server that stores information regarding whether the mobile terminal is authorized to receive a backup IP address if an IP address cannot be obtained from the server, and whether the mobile terminal is a user of a real-time application;

means for sending a public IP address from the NAS to the mobile terminal upon determining that the mobile terminal is a user of a real-time application; and means for sending a private IP address from the NAS to the mobile terminal upon determining that the mobile terminal is not a user of a real-time application.

17. In a General Packet Radio Service (GPRS) network, a method in a Gateway GPRS Service Node (GGSN) for dynamically allocating Internet Protocol (IP) addresses to mobile terminals operating in the GPRS network, said GGSN connecting the GPRS network to a plurality of servers that allocate IP addresses in an IP-based network, said method comprising the steps of:

obtaining a first IP address for a first mobile terminal from a first server;

obtaining a second IP address for a second mobile terminal from a second server;

determining whether the first IP address and the second IP address are duplicate IP addresses;

releasing the second IP address upon determining that the first IP address and the second IP address are duplicate IP addresses; and obtaining a third IP address for the second mobile terminal that is not the same as the first IP address.

18. In a General Packet Radio Service (GPRS) network, a method of dynamically setting up a Layer 2 Tunneling Protocol (L2TP) tunnel from a Gateway GPRS Service Node (GGSN) to a Virtual Private Network (VPN), said method comprising the steps of:

sending a predetermined number (Ni) of requests for an Internet Protocol (IP) address from the GGSN to a server, each of the requests being separated by time (Ti);

determining that time period Ti expired following a last request in the sequence of Ni requests without receiving in the GGSN, a response from the server that includes an IP address for the mobile terminal; and examining by the GGSN, an Access Point Name (APN) to deduce tunnel endpoint parameters for setting up the L2TP tunnel.

* * * * *